United States Patent [19]

Sieksmeyer et al.

[11] Patent Number: 5,073,256
[45] Date of Patent: Dec. 17, 1991

[54] EQUIPMENT FOR BIOLOGICAL WATER TREATMENT, IN PARTICULAR FOR DENITRIFICATION OF RAW WATER TO PRODUCE POTABLE WATER

[75] Inventors: Rolf Sieksmeyer; Jürgen Wittek, both of Nordenham, Fed. Rep. of Germany

[73] Assignee: Norddeutsche Seekabelwerke AG, Nordenham, Germany

[21] Appl. No.: 450,892

[22] Filed: Dec. 14, 1989

Related U.S. Application Data

[60] Division of Ser. No. 121,835, Nov. 17, 1987, Pat. No. 4,935,130, which is a continuation of Ser. No. 800,939, Nov. 22, 1985, abandoned.

[30] Foreign Application Priority Data

Nov. 22, 1984 [DE] Fed. Rep. of Germany ....... 3442510
Dec. 22, 1984 [DE] Fed. Rep. of Germany ....... 3447177

[51] Int. Cl.$^5$ .............................................. C02F 3/30
[52] U.S. Cl. .................................................... 210/151
[58] Field of Search .............. 210/619, 150, 151, 903

[56] References Cited

U.S. PATENT DOCUMENTS 3,704,783 12/1972 Antonie ............................. 210/151
4,211,647 7/1980 Friedman et al. .................. 210/150
4,330,408 5/1982 McClure ............................. 210/150

FOREIGN PATENT DOCUMENTS 161077 11/1985 European Pat. Off. ............ 210/619
51-90759 9/1976 Japan .................................. 210/619
60-890 5/1985 Japan .................................. 210/619

*Primary Examiner*—Thomas Wyse
*Attorney, Agent, or Firm*—Sughrue, Mion, Zinn, Macpeak & Seas

[57] ABSTRACT

Known types of equipment for the biological denitrification of potable water require (back) washing of the reactors from time to time. These denitrification processes proceed therefore in a discontinuous manner. The invention proposes a continuously operating denitrification process with a simple equipment arrangement. This is achieved by sumberged drum reactors (12, 14) which rotate in a first, anoxic biological stage (10) and in a second, aerobic biological stage (13). The immersion bodies (immersion body segments 31) contained in these reactors are, due to the rotation, continuously washed during the treatment of the potable water. Moreover, the sumberged drum reactors (12, 14) of the two biological stages (10, 13) are arranged according to the invention on a common drive shaft (26) with a drive element (drive motor 27).

5 Claims, 6 Drawing Sheets

EQUIPMENT FOR BIOLOGICAL WATER TREATMENT, IN PARTICULAR FOR DENITRIFICATION OF RAW WATER TO PRODUCE POTABLE WATER This is a divisional of application Ser. No. 07/121,835, filed Nov. 17, 1987, U.S. Pat. No. 4,935,130, which is a continuation of application Ser. No. 06/800,939, filed Nov. 22, 1985, abandoned.

BACKGROUND OF THE INVENTION

1. Field of the Invention

The invention relates to a process for biological water treatment, in particular for denitrification of raw water to produce potable water. The invention also relates to equipment suitable for biological denitrification, in particular of potable water.

2. Description of the Related Art

The raw water used for the production of potable water, for example ground water, is increasingly subject to environmental pollution. Above all, nitrates from fertilizers, manure or the like pass into the ground water. The potable water produced from the latter must therefore be freed from nitrate (denitrified) before consumption or at least to such an extent that it meets the statutory requirements. It can also become necessary to denitrify treated industrial water.

Multi-stage denitrification is known, in which the nitrate-containing raw water is first passed, with the addition of a reducing agent, for example ethanol, glucose or the like, into an anoxic reactor packed with carrier materials. As a result of the added reducing agent, bacteria which reduce the nitrate to molecular gaseous nitrogen are formed on the carrier material. At the same time, the carbon-containing reducing agents provide an organic carbon supply, namely as an energy carrier, for the bacteria in the reactor. The potable water pretreated to this extent then requires an aerobic, biologically active filtration. In such a filter, the excess substances added as reducing agents and biomass are to be removed from the potable water, with addition of oxygen.

A disadvantage of this known process is the discontinuous course of the denitrification. This results from the fact that the reactors must be washed at regular intervals in order to remove the excess biomass produced. Moreover, the quality of the treatment in the first process stage depends on the age of the biomass in the anoxic reactor. An expensive combination of processes for final purification of the denitrified water is therefore necessary in every case. For this reason, the known biological denitrification process requires careful process supervision and intensive servicing of the unit. With known static carrier material packing, there is a risk, in the event of uneven flow through it, of the biomass caking, as a result of which undesired nitrite can be formed.

This known process also has disadvantages in respect of equipment. In fact, in order to avoid the complete close-down during the frequently necessary washing of the reactors, several reactors should be provided, of which alternately one reactor is always in operation, while the other reactor is being back-washed.

SUMMARY OF THE INVENTION

It is therefore the object of the invention to provide a process which is easy to control, in particular a continuous process, and inexpensive equipment of simple structure for the denitrification, in particular of potable water.

To achieve this object, the process according to the invention has the result that, in the second stage with supply of oxygen, the aerobic microorganisms degrade the secondary matter from the first stage, namely excess reducing agents and a part of the biomass discharged from the anoxic reactor. This has the advantage that, in the process according to the invention, a simple mechanical filter can be used as the downstream filter, that is to say biological filter, such as is necessary in the denitrification process of the state of the art, which is difficult to control on line, can be omitted. Since the secondary matter is biologically degraded, the residual biomass which may still be present in the potable water after the mechanical filtration is very largely harmless.

According to the process, it is also proposed to use rotary submerged drum reactors in both water treatment stages, namely the first anoxic biological stage and the second aerobic biological stage. Due to the continuous rotary movement of the reactors in the vessel with the potable water to be treated, excess biomass or reducing agents are continuously washed out of the immersion bodies located in the submerged drum reactors. Only a thin, but biologically active layer of bacteria thus remains on the immersion body surfaces. The backwashes required in the state of the art are accordingly unnecessary. Therefore, the denitrification process according to the invention allows virtually uninterrupted operation of the unit. Blockages of the immersion bodies are prevented, since they continuously move in the potable water to be treated.

At the same time, on the one hand, there is even continuous washing through the immersion bodies and, on the other hand, controlled flow of the water to be treated through the vessels of the individual treatment stages takes place, so that optimum nutrient absorption and optimum gas exchange are obtained.

The equipment according to the invention for achieving this object consists of conventional components. The submerged drum reactors can easily be installed into and removed from the appropriate vessels and are easy to control.

According to a further proposal of the invention, the submerged drum reactors in the individual vessels are of approximately identical design and are mounted on a common drive shaft. Since identical submerged drum reactors are used, these can be economically mass-produced. The mounting on a common drive shaft provides a compact installation which requires only one drive. Depending on the capacity of the unit, one or several submerged drum reactors can be arranged in series within one vessel, that is to say within one treatment stage.

Advantageously, the vessels, receiving the submerged drum reactors, for the individual treatment stages should be arranged, for space reasons, either immediately side by side or at a small spacing.

According to the invention, the submerged drum reactors are composed of a three-dimensional support structure and the immersion body arranged therein. In an advantageous embodiment of the invention, the immersion bodies in turn consist of a plurality of immersion body segments. In this way, the submerged drum reactors can be assembled from smaller components (which are easy to handle). In the event of faults occurring in the submerged drum reactor, individual segments can be replaced.

The support structure is composed of profile bars which run radially to the longitudinal centre axes of the submerged drum reactors and are arranged in such a way that they guide the individual immersion body segments along their radially directed edges. To secure the individual immersion body segments against dropping out of the drum reactors, clamping rings are used which surround the outer periphery of the drum reactors and, formed either integrally or likewise as segments, are connected to the free ends of the profile bars of the support structure.

In the first, anoxic biological stage, operating with exclusion of oxygen, the vessel receiving the submerged drum reactor may be designed to be gas-tight. In this stage, about half of the submerged drum reactor can be immersed into the water to be treated. As a result, the bacteria growing on the immersion body can start nitrate respiration after a short initial phase, that is to say reduce the nitrate ion to gaseous nitrogen by utilizing the three oxygen atoms bonded in the ion. Since air is excluded from the vessel, the brief emergence of a part of the submerged drum reactor from the water does not adversely affect the activity of the bacteria film. Preferably, the denitrification in the first, biological stage can be carried out in an open vessel, but with a submerged drum reactor which is completely immersed into the water to be treated. In this case, the continuing exclusion of oxygen feed from the biological film, as necessary for the nitrate reduction, is the result of the fact that the immersion body segments are continuously immersed in the water to be treated. In other words, the submerged drum reactor or reactors in the first (anoxic) biological stage is or are completely immersed into the (potable) water to be treated, in order to isolate the submerged drum reactor from oxygen.

In the second, aerobic biological stage, the treatment takes place in an open vessel with oxygen supply. In this treatment stage, about half of the submerged drum reactor is immersed into the denitrified water. Due to the rotation of the submerged drum reactor, the water is continuously aerated for the formation of an aerobic bacteria film on the immersion body of this treatment stage. The aerobic bacteria thus consume the remainder of the excess reducing agent metered into the first treatment stage and a part of the biomass discharged during the denitrification from the first submerged drum reactor.

According to the invention, the vessels of the two treatment stages are mutually connected by an overflow. The latter is arranged in such a way that a water level which is higher than that in the second treatment stage is automatically established in the vessel of the first treatment stage, in order to ensure the required depths of immersion of the submerged drum reactors which effect different treatments. As a result, expensive control systems for adjusting the required levels in the individual treatment vessels can be omitted.

Finally, the invention proposes to place the overflow, a water feed into the first treatment vessel and a water discharge from the second treatment vessel in the vicinity of the corners of the vessels, especially in a zig-zag form, so that the water feed and water discharge are approximately diagonally opposite in each vessel. In this way, a formation of dead zones and short-circuit flows while water flows through the individual vessels is avoided. As a result, there is intensive flow around the biological film on the immersion bodies. At the same time, the formation of dead zones with stagnant water in the vessels is avoided, in favour of likewise intensive treatment of the potable water.

Further features of the invention relate to the constructional design of the support structure and of the immersion body segments of the drum reactors.

BRIEF DESCRIPTION OF THE DRAWINGS

An illustrative embodiment of the invention is explained in more detail below by reference to the drawings in which.

DESCRIPTION OF THE PREFERRED EMBODIMENT

Figure 1:
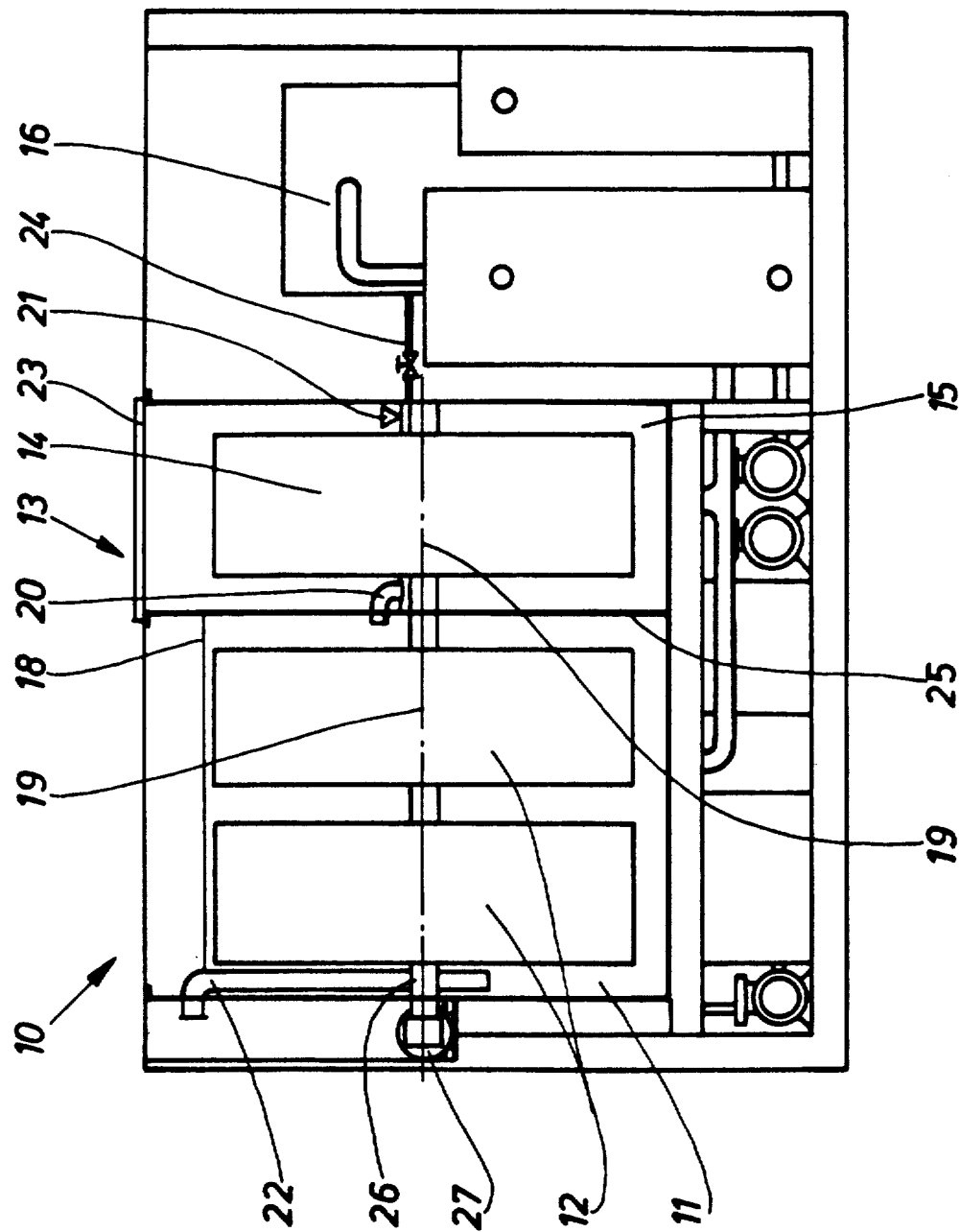
FIG. 1 shows a diagrammatic side view of the equipment.

The present illustrative embodiment relates to compact equipment for the biological denitrification of potable water.

The equipment consists of a (first) anoxic biological stage 10 with a vessel 11, in which two submerged drum reactors 12 are arranged side by side, of a (second) aerobic biological stage 13 with a vessel 15 containing a submerged drum reactor 14, and of a mechanical filter unit 16 of a design type known per se.

The vessel 11 of the first biological stage 10 is open and anoxic conditions are ensured by a complete submersion of the drum reactors in water. In cross-section (not shown), the lower half of the vessel 11 approximately matches the curvature of the submerged drum reactors 12, that is to say, in the lower half, the wall of the vessel 11 extends at a spacing from and approximately parallel to the submerged drum reactors 12.

In the present illustrative embodiment, the water level 18 in the vessel 11 of the first biological stage 10 is above the submerged drum reactors 12. An overflow pipe elbow 20 connecting the vessels 11 and 15 serves for maintaining the envisaged water level 18 in the vessel 11. For this purpose, a horizontal section, ending in the vessel 11, of the overflow pipe elbow 20 is arranged at a height above the water level 18. A vertical pipe section, leading into the vessel 15, of the overflow pipe elbow 20 ends below the water level 21 in the vessel 15 of the second biological stage 13.

The water to be treated, namely the ground water provided with reducing agents, passes through a feed pipe elbow 22 into the vessel 11 of the first biological stage 10. In this illustrative embodiment, the horizontal pipe section of the feed pipe elbow 22 enters an upper region of the vessel 11 and its (long) vertical pipe section protrudes deep into the water which is to be denitrified in the first biological stage 10. In the present illustrative embodiment, the feed pipe elbow 22 enters the water from above, at about one third of the height of the water level 18. The overflow pipe elbow 20 and the feed pipe elbow 22 are allocated to approximately diagonally opposite corner regions of the vessel 11 of the first (anoxic) biological stage 10.

The upper side 23 of the vessel 15, which in this case has only one submerged drum reactor 14, of the second (aerobic) biological stage 13 is not closed. Thus, in contrast to the vessel 11, aeration of the water to be treated is possible in this vessel 15. The water level 21 in the vessel 15 is slightly above the longitudinal centre axis 19 of the drum reactor 14. The water level 21 of the second biological stage 13 is thus below the water level 18 of the first biological stage 10. The envisaged water level 21 in the level 15 is maintained—as in the vessel 11—by means of a discharge pipe 24 arranged at an appropriate height. The denitrified potable water passes through this discharge pipe into the mechanical filter unit 16. Commercially available, mechanical filter units can be used for this purpose, provided that they do not conflict with continuous operation of the biological stages 10 and 13.

Figure 2:
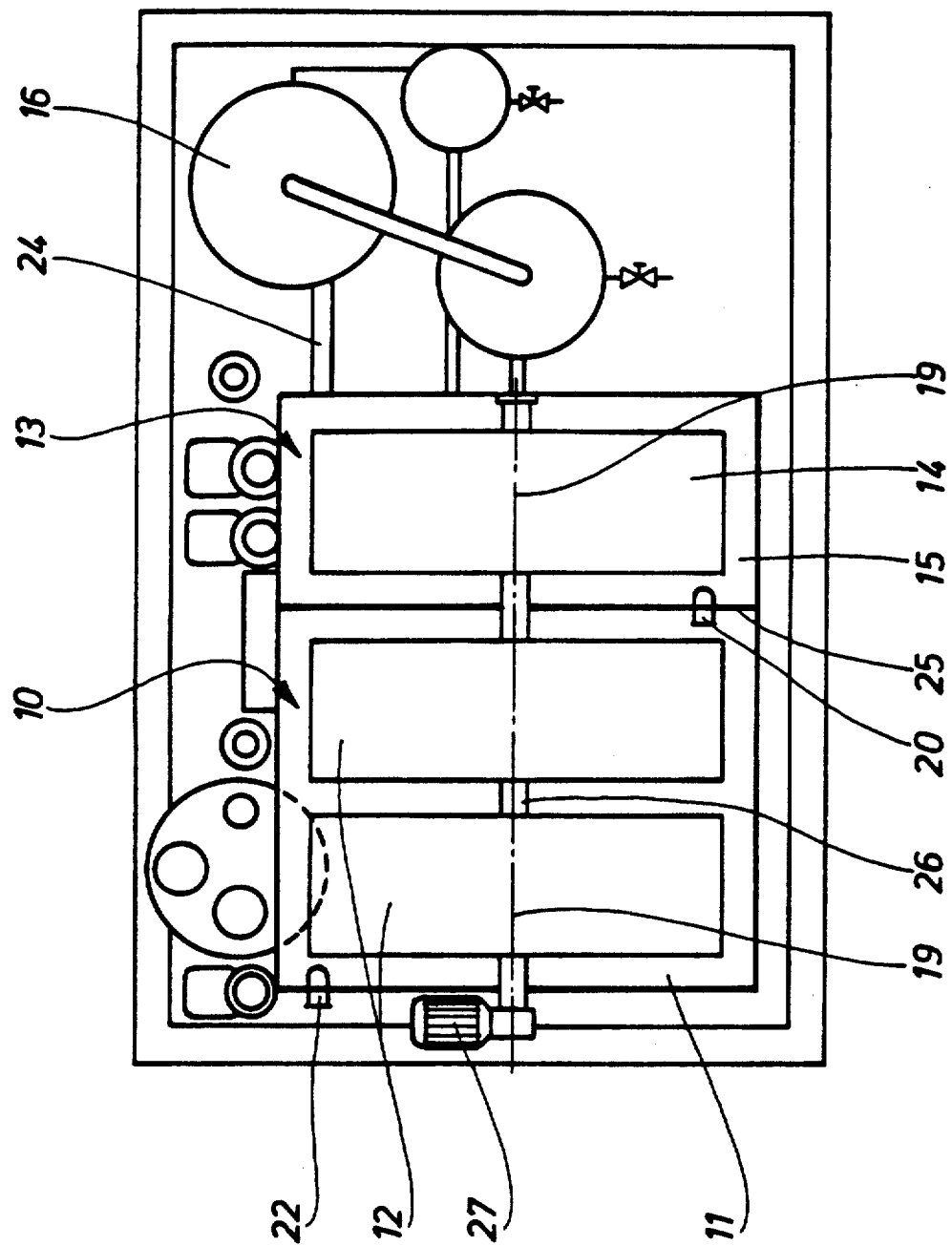
FIG. 2 shows a diagrammatic plan of the equipment according to FIG. 1.

In the present illustrative embodiment, the vessel 11 and 15 have identical—approximately trough-shaped—cross-section. The vessels 11 and 15 are arranged one immediately behind the other, with a common central partition 25. The discharge pipe 24 in turn is arranged in the corner region of the vessel 15, diagonally opposite the overflow pipe elbow 20. The feed pipe elbow 22 for the vessel 11 and the discharge pipe 24 in the vessel 15 are therefore approximately opposite one another (FIG. 2). With respect to height, the discharge pipe 24 and the overflow pipe elbow 20 are offset corresponding to the different water levels 18 and 21 in the vessels 11 and 15 respectively, since the discharge pipe 24 is in fact arranged lower down.

The two submerged drum reactors 12 in the vessel 11 and the submerged drum reactor 14 in the vessel 15 are mounted on a common, continuous drive shaft 26 (FIGS. 1 and 2). The shaft extends along the longitudinal centre axes 19 of the submerged drum reactors 12 and 14, so that the latter are located in series at the same height.

Figure 4:
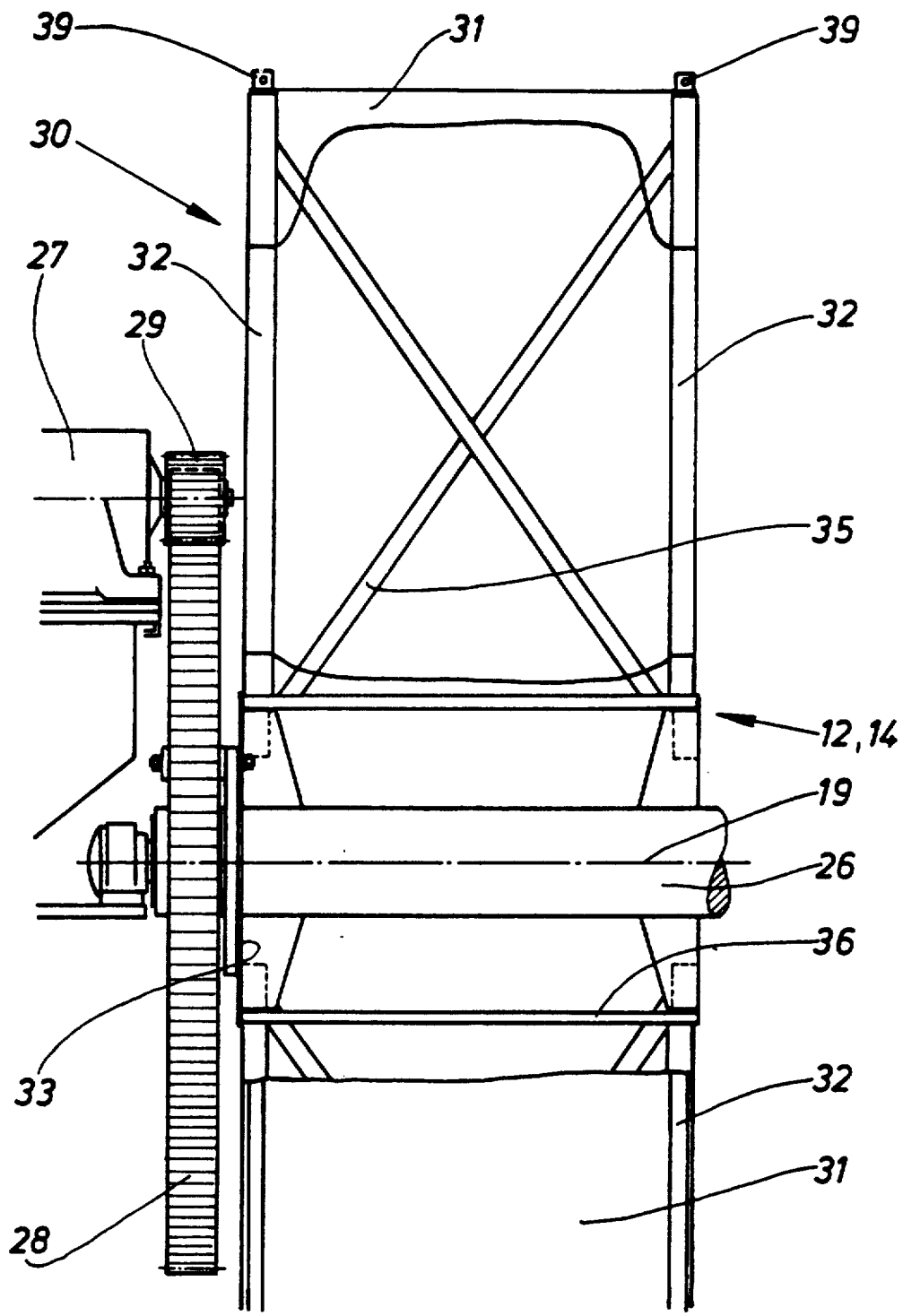
FIG. 4 shows a cross-section, partially shown enlarged, through the submerged drum reactor according to FIG. 3.

All the submerged drum reactors 12, 14 are driven by a common electric motor 27 which is arranged outside the vessels 11 and 15 (FIGS. 1, 2, 4). To reduce the motor speed to a relatively low drive speed of the drum reactors 12, 14, a gearbox 28 (FIGS. 1, 2) between the drive shaft 26 and the drive motor 27 or alternatively an open cog wheel drive, consisting of a relatively large cog wheel 28 allocated to the front submerged drum reactor 12 in the vessel 11 and of a small pinion 29 associated with the drive motor 27, can be provided (FIG. 4).

Figure 3:
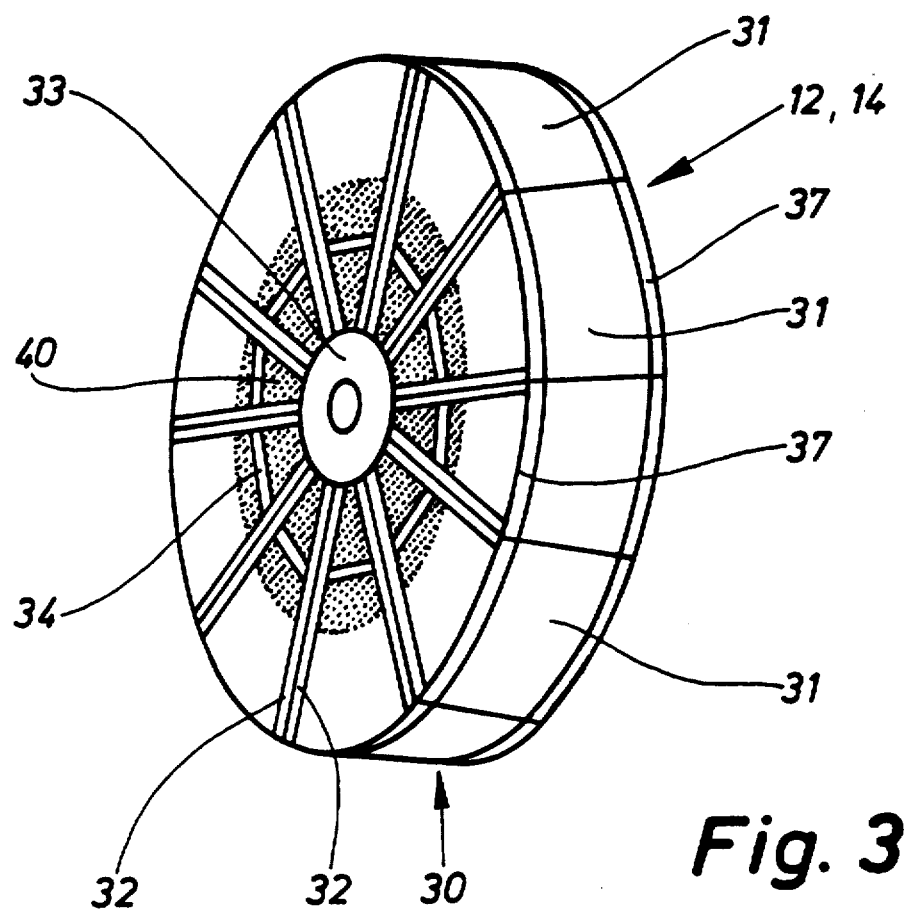
FIG. 3 shows a perspective overall view of a submerged drum reactor.

In the present illustrative embodiment, the three submerged drum reactors 12, 14 are of the same design. Each submerged drum reactor 12, 14 consists of a three-dimensional cylindrical support structure 30 which receives the immersion body consisting in the present illustrative embodiment of a total of ten immersion body segments 31 (FIG. 3).

Figure 5:
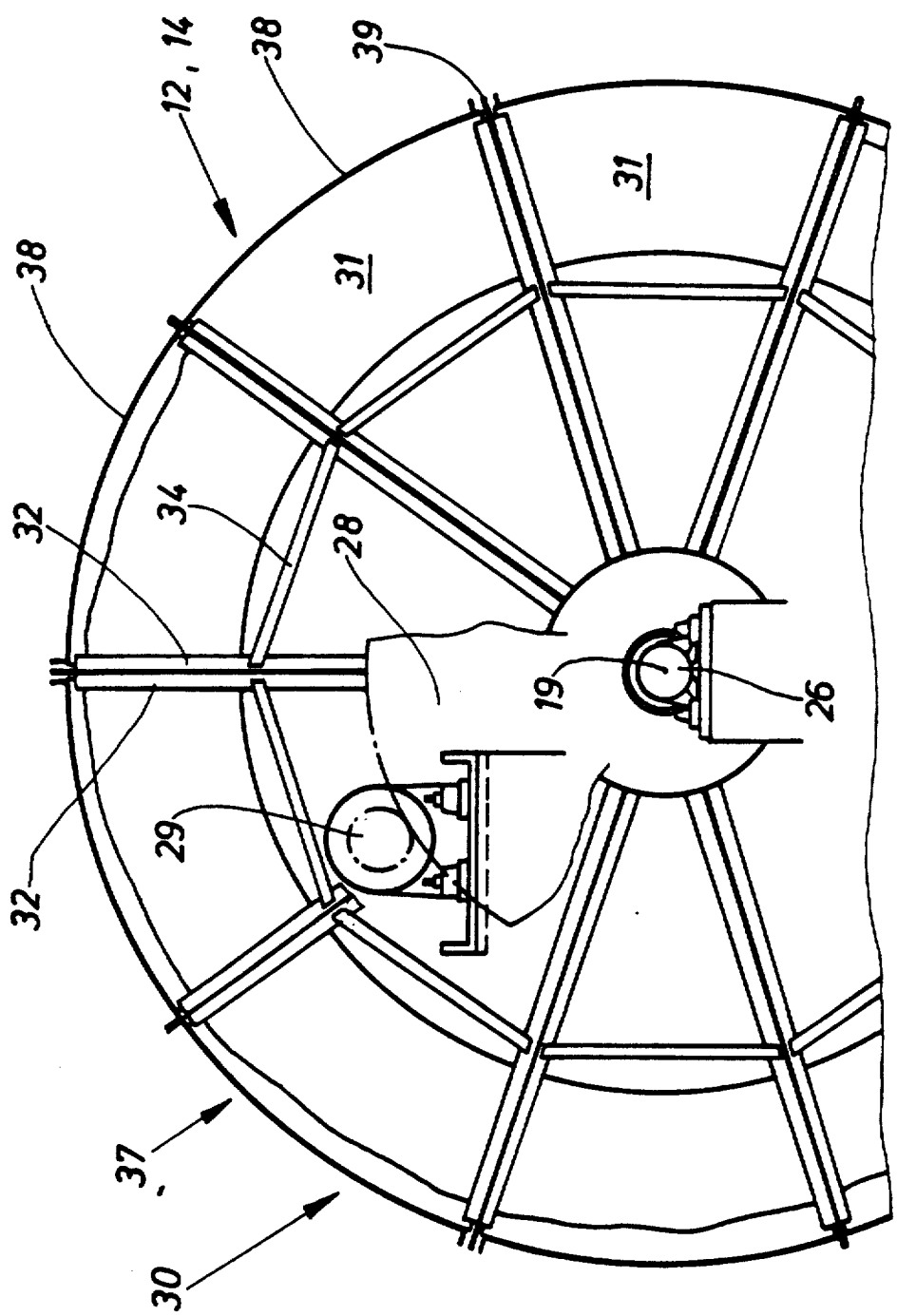
FIG. 5 shows a partial side view of the submerged drum reactor according to FIG. 4.

The support structure 30 consists of radially directed, T-shaped profile bars 32 which are located in two mutually spaced, upright (end) planes of the submerged drum reactors 12, 14. The ends, pointing to the centre of the submerged drum reactors 12, 14, of the profile bars 32 are joined to the drive shaft 26 by collars 33 fitted thereto (FIG. 4). At the end faces of the submerged drum reactors 12, 14, the profile bars 32 are braced to one another by transverse struts 34 (FIG. 5). In the radially directed plane, transversely thereto, between two immersion body segments 31, the profile bars 32 mutually adjacent in pairs are also strutted, namely by a bracing 35 which extends in the shape of an X to the ends of the profile bars 32 (FIG. 4).

The dimensions of the support structure 30 and the arrangement of the profile bars 32 are such that the total of ten immersion body segments 31, provided in this illustrative embodiment, can be inserted from the outside into the support structure 30. For doing this, the immersion body segments 31 are guided in the corner regions of the radially directed longitudinal edges by the T-shaped profile of the profile bars 32.

In the region of the hub of the support structure 30, cross struts 36 extending parallel to the drive shaft 26 at a distance are provided. These limit the depth of insertion of the immersion body segments 31 into the support structure 30.

On the outer periphery, the support structure 30 has two clamping rings 37, which are each allocated to an (end) plane formed by the profile bars 32. In the present illustrative embodiment, the clamping rings 37 are each assembled from ten ring segments 38. These ring segments each connect the outer free ends of two profile bars 32 lying in one plane. For this purpose, each profile bar 32 has, on its free outer end, a bracket 39 to which two opposite ring segments 38 are bolted. The arrangement of the ring segments 38 of the support structure 30 is such that these segments cover the edge regions of the outer curved surface of the immersion body segments 31 from the outside of the submerged drum reactors 12, 14, in order to secure the immersion body segments 31 in the submerged drum reactors 12, 14.

Figure 6:
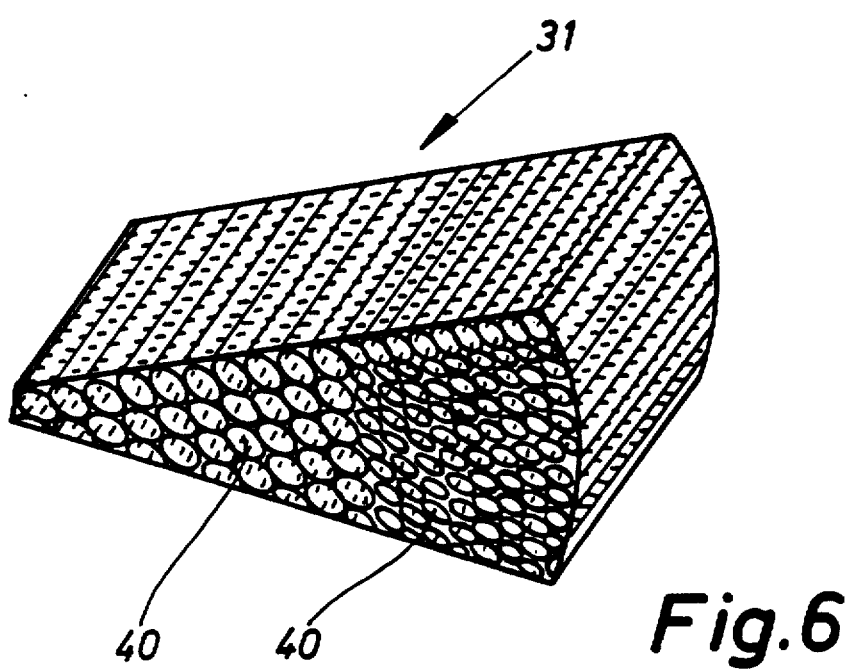
FIG. 6 shows a perspective illustration of an immersion body segment.

Each immersion body segment 31 consists of a multiplicity of open-mesh pipes 40 which run parallel to the longitudinal centre axis 19 of the submerged drum reactors 12, 14 (FIG. 3, FIG. 6). The individual open-mesh pipes 40 packed together to give an immersion body segment 31 are mutually joined by welding of the opposite end faces.

The diameters of the individual open-mesh pipes 40 of an immersion body segment 31 can differ. For example, open-mesh pipes 40 of larger diameter can be arranged towards the interior of the submerged drum reactor 12, 14, whereas open-mesh pipes 40 of smaller diameter are used on the outside (FIG. 6). Alternatively, it is also conceivable to provide smaller open-mesh pipes 40 in the interior of the submerged drum reactor 12, 14 than on the outside. This gives a geometrical surface area of approximately the same size in all the regions of the submerged drum reactor 12, 14. The diameters of the open-mesh pipes 40 can be 10 mm–70 mm. This can give a geometrical surface area per segment volume of between 100 $m^2/m^{+3}$ and 400 $m^2/m^{+3}$.

Figure 7:
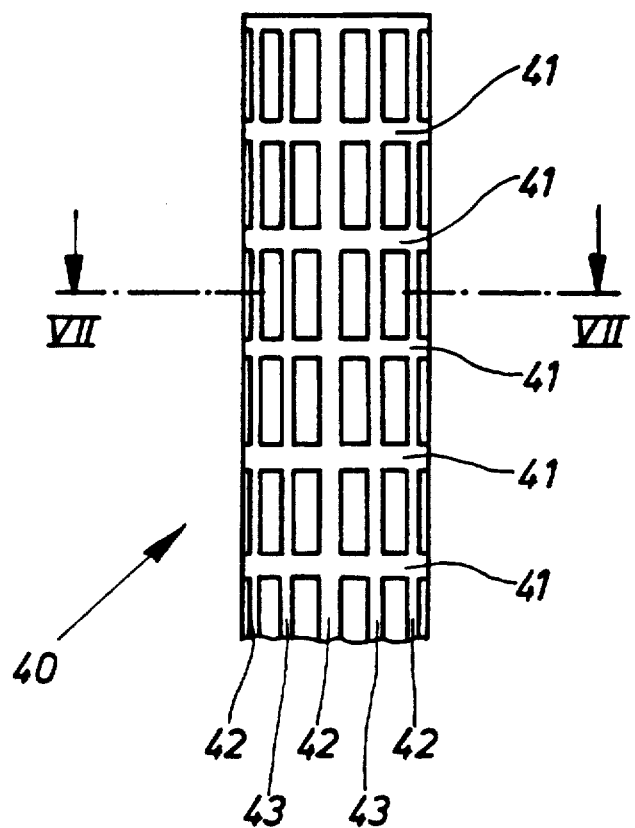
FIG. 7 shows a side view of a section of an open-mesh pipe.
Figure 8:
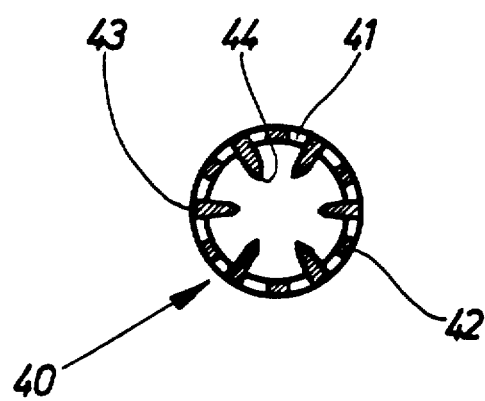
FIG. 8 shows a cross-section VII—VII through the open-mesh pipe according to FIG. 7.

The open-mesh pipes 40 consist of longitudinal fibers 42 crossing circular fibers 41 of approximately the same cross-sectional dimensions (FIG. 7). Between the longitudinal fibers 42, the open-mesh pipes 40 have in each case a longitudinal web 43. The latter has a pointed, triangular cross-section with radially inward-directed spikes 44 protruding into the open-mesh pipe 40 (FIG. 8).

The equipment of the illustrative embodiment described operate as follows:

The ground water to be treated is passed via the feed pipe elbow 22 with addition of reducing agents into the vessel 11 of the first (anoxic) biological stage 10. In the latter, the bacteria forming on the open-mesh pipes 40 reduce the nitrate content in the ground water to gaseous nitrogen. The potable water denitrified in this way then passes through the overflow pipe elbow 20 into the vessel 15 of the second biological stage 13. The excess reducing agents and the bacteria, washed out of the first biological stage 10, in the aerated water are biodegraded here. Finally, water treated in this way passes via the discharge pipe 24 from the second biological stage 13 into the mechanical filter unit 16. The latter filters the excess biomass, purely mechanically, out of the potable water. A final biological treatment in the mechanical filter unit 16 is no longer necessary.

Due to the common drive of the submerged drum reactors 12, 14 from the drive shaft 26, the submerged drum reactors 12, 14 in both biological stages 10, 13 are moved continuously at the same speed for even washing through the immersion body segments 31.

Alternatively, the equipment according to the invention can be used for denitrifying effluents. An artificial addition of reducing agents or nutrients for the bacteria in the biological treatment stages can then sometimes be omitted, since in most cases these are already present in the effluent.

We claim:

1. Equipment for biological denitrification of potable water, comprising:
    inlet means (22) for receiving nitrate-containing potable water including reducing agents;
    an anoxic biological stage (10) comprising: an open first vessel (11), coupled to said inlet means (22), for receiving the water; and a first drum reactor (12) which is completely submerged in the water in said open vessel (11) and which is fixed to a rotatable drive shaft (26) extending horizontally along a longitudinal axis (19) through the centre of rotation of said drum reactor;
    an aerobic biological stage (13) for aerating the water and comprising: an open second vessel (15); a second drum reactor (14) which is only partially submerged and which is also fixed to said drive shaft (26); and discharge pipe means (24) for discharging water from said second open vessel (15);
    a common central partition (25) separating said open vessels; and
    connecting line means (20) connecting said open vessels in series for feeding the water from the first open vessel to said second open vessel.

2. Equipment according to claim 1, characterized in that the connecting line means comprises an overflow pipe elbow (20), which is arranged with respect to its height in such a way in the first vessel (11) that a desired water level (18) of the water to be treated is established therein.

3. Equipment according to claim 2, characterized in that said inlet means comprises a feed pipe elbow (22), for feeding the water to be treated into the vessel (11), arranged in a corner region approximately diagonally opposite the overflow pipe elbow (20) and ending below the water level (18) in the vessel (11).

4. Equipment according to claim 3, characterized in that said discharge pipe means (24) for the water from the second vessel (15) is arranged on the side opposite the overflow pipe elbow (20) at such a height that a desired water level (21) of approximately half the height of the second drum reactor is established.

5. Equipment according to claim 4, characterized in that the feed pipe elbow (22), the overflow pipe elbow (20) and the discharge pipe means (24) are arranged to be distributed, in a zig-zag shape relative to the plane of the vessels (11, 15), over diagonally opposite corner regions of the vessels.

* * * * *